United States Patent
Rennick

[15] 3,681,700
[45] Aug. 1, 1972

[54] ACCURATE SQUARE-LAW DETECTOR CIRCUIT

[72] Inventor: Lyle V. Rennick, Costa Mesa, Calif.

[73] Assignee: Northrop Corporation, Beverly Hills, Calif.

[22] Filed: Sept. 29, 1969

[21] Appl. No.: 861,789

[52] U.S. Cl.................................328/144, 307/229
[51] Int. Cl. .................................................G06g 7/20
[58] Field of Search..............329/205, 206; 328/144; 307/229, 237; 235/197; 324/132

[56] References Cited

UNITED STATES PATENTS

| | | | |
|---|---|---|---|
| 2,810,107 | 10/1957 | Sauber | 235/197 |
| 2,890,832 | 6/1959 | Stone | 235/197 |
| 2,900,137 | 8/1959 | Giser | 328/144 |
| 2,963,647 | 12/1960 | Dean | 235/197 |
| 3,205,347 | 9/1965 | Wright | 328/144 |
| 3,525,860 | 8/1970 | Barber | 235/194 |
| 3,441,728 | 4/1969 | Halfhill et al. | 328/144 |
| 2,949,543 | 8/1960 | Nordahl et al. | 307/237 X |
| 3,130,323 | 4/1964 | Swain | 307/229 |

FOREIGN PATENTS OR APPLICATIONS 860,681 2/1961 Great Britain................324/132

Primary Examiner—Donald D. Forrer
Attorney—William W. Rundle and Willard M. Graham

[57] ABSTRACT

A silicon diode is connected in series with the input of an operational amplifier having a feedback resistor, and the modulated ac signal to be detected is fed to the input side of the diode. The signal current through the diode is an accurate function of only the voltage across the diode, and the output voltage of the operational amplifier is proportional to such diode current.

2 Claims, 2 Drawing Figures

PATENTED AUG 1 1972 3,681,700

INVENTOR
LYLE V. RENNICK
BY William W. Rundle
AGENT

ACCURATE SQUARE-LAW DETECTOR CIRCUIT

The present invention relates to detectors of modulated ac signal waveforms, and more particularly, to an accurate square-law detector for use in operating on bursts of high frequency pulses.

The conventional means for detecting a video pulse from a burst of intermediate frequency signal includes a diode-capacitor combination having a resistor in parallel with the capacitor, and having the output taken from across the resistor. This is satisfactory for most audio and video applications, but is not accurate enough for use in noise figure measurement, for example, where fractional db accuracy is required. It is known that the current through a diode is approximately proportional to the square of the applied forward voltage across the diode over a certain range of amplitudes. However, circuits of the above-described type do not accurately follow this square-law relation.

It is an object of the present invention to provide a detector having a square-law diode together with signal producing means which accurately uses this square-law relationship.

A further object is to provide a square-law detector in which means are included to bias the diode at a desired dc operating point.

Briefly, my invention comprises a square-law diode having one lead connected to an input of an operational amplifier and the other lead adapted to be connected to a source of modulated ac signal to be detected. Feedback means are connected around the operational amplifier to maintain the said input thereto at an essentially constant potential during operation. Bias resistance means are preferably connected from a suitable power supply to opposite sides of the diode. Filter means is also provided to substantially eliminate the high frequency from the detector output.

The invention will be more fully understood by reference to the detailed description of a specific embodiment to follow, together with the accompanying drawings.

Figure 1:
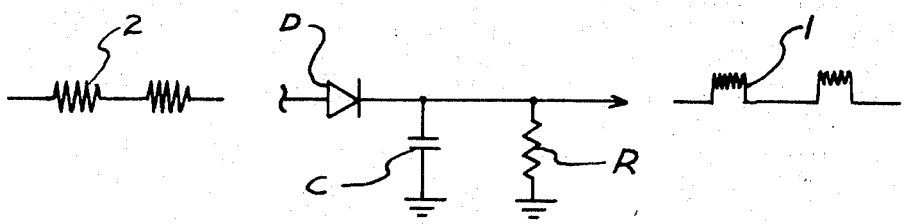
FIG. 1 is a schematic diagram of a typical conventional detector.

Referring first to FIG. 1, this is a conventional detector for providing video pulses 1 from bursts of I.F. signal 2. The output of a circuit of this type is approximately linear (with offset) to the input for large amplitude signals and approaches square-law for small amplitude signals. As mentioned before, the current through diode D is proportional to the square of the applied forward voltage across diode D at certain amplitudes. However, the output from across resistor R will not be proportional to the desired square of the applied voltage because the voltage across diode D is a function of not only the input voltage but the output voltage as well.

Figure 2:
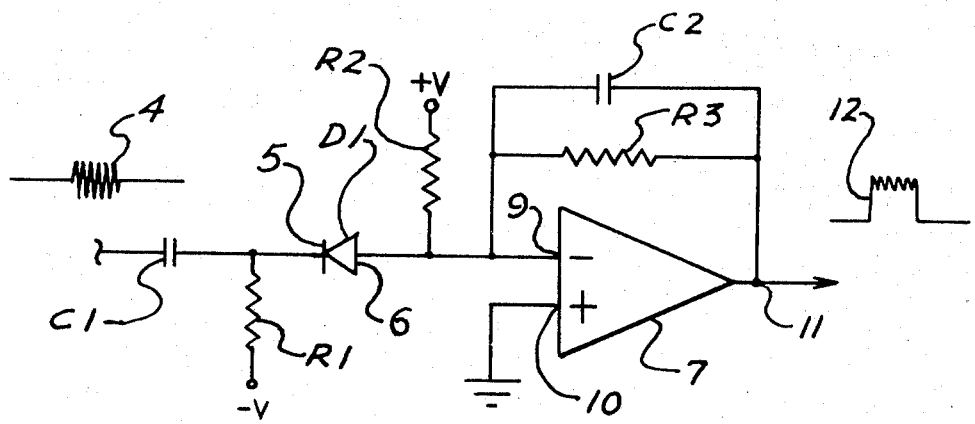
FIG. 2 is a schematic diagram showing a particular embodiment of the present invention.

The present invention is illustrated in FIG. 2. A coupling capacitor C1 has its input side connected to a source (not shown) of the ac signal to be detected. In this case the input signal is represented by a burst of I.F. pulses 4. The output side of capacitor C1 is connected to the cathode 5 of a diode D1 having a square-law characteristic. This diode D1 is preferably a silicon signal diode produced by any of several manufacturing methods which result in the current through the diode being proportional to the square of the forward voltage across the diode over a suitable desired range of forward conduction.

The anode 6 of diode D1 is connected directly to the input of an operational amplifier 7. As illustrated, this may be a differential amplifier, with the diode being connected to the minus input terminal 9. The plus input terminal 10 is connected to ground.

A bias resistor R1 is connected from the cathode 5 of D1 to a negative voltage source −V and another bias resistor R2 is connected from the anode 6 of D1 to a positive voltage source +V.

A feedback resistor R3 is connected across the operational amplifier 7 from an output terminal 11 to the minus input terminal 9, and a filter capacitor C2 is connected in parallel with resistor R3. A video output pulse 12 is obtained from the output terminal 11.

Bias resistor R1 is chosen in conjunction with the negative power supply voltage to provide a forward dc bias current through diode D1 at which the most optimum square-law relation occurs. Bias resistor R2 is chosen in conjunction with the positive power supply voltage to provide the desired dc operating point at the output of the operational amplifier 7.

In operation, the feedback current through resistor R3 exactly equals the current through diode D1 produced by the input pulses 4. These currents balance each other and maintain the summing junction at the minus input terminal 9 at zero, or ground, potential. Of course, a very small voltage must appear at this amplifier input to make the amplifier work, but the operational amplifier 7 has a very high gain so that the anode 6 of diode D1 remains essentially at zero potential. Therefore, the signal current through diode D1 is a function of only the applied voltage at the cathode 5. The output signal taken between the amplifier output terminal 11 and ground is the desired signal which is representative of the current through diode D1. Of course the voltage across feedback resistor R3 is the same as the output voltage. Operational amplifier 7 functions as a current-to-voltage converter.

The feedback resistor R3 also governs the operational amplifier 7 gain. Capacitor C2 filters the I.F. frequency from the output.

It is thus seen that the output signal accurately follows the square-law relation of the diode D1, and thus an accurate square-law detector is provided.

Coupling capacitor C1 can be omitted if there is no dc in the input signal to block. Although the present embodiment has been described as operating upon bursts of pulses such as occur in the operation of a radar system, it can also be used to perform detection of a continuous I.F. or R.F. signal. In the event it is used in a continuous waveform system, means should be added to enable a drift adjustment at the input of the operational amplifier 7. The ac input signal should also be set to keep its amplitude at an optimum average level for square-law detection. However, for use in a noise figure meter, the present circuit functions admirably as shown, since only the difference in amplitude between the top and bottom of the output pulse 12 is important.

What is claimed is:

1. A square-law detector comprising an operational amplifier in the form of a high-gain difference amplifier, a diode having an approximate square-law region of operation having one side thereof connected directly to one input of said difference amplifier and the other side adapted to be connected to a modulated ac input signal, the other input of said difference amplifier connected to a signal ground, a feedback resistance connected across said amplifier to carry a signal current equal to the forward diode current produced by the input signal, a first bias resistance connecting the cathode of said diode to a source of constant negative voltage relative to the anode thereof, and a second bias resistance connecting the anode of said diode to a source of constant positive voltage relative to said cathode, the resistances of said bias resistances being chosen to provide a forward d.c. bias current through said diode at which the most optimum square-law relation occurs and also to provide a desired dc operating point at the output of said amplifier, whereby said one input of said difference amplifier is maintained substantially at signal ground potential during operation and the output voltage of said amplifier is essentially proportional to the square of the forward signal voltage across said diode.

2. Apparatus in accordance with claim 1 including a filter capacitance connected across said feedback resistance, and a coupling capacitance connected in series with said other side of said diode.

* * * * *